United States Patent [19]

Bohm et al.

[11]  4,250,273

[45]  Feb. 10, 1981

[54] THERMOPLASTIC ELASTOMER BLENDS

[75] Inventors: Georg G. A. Bohm, Akron; Gary R. Hamed, Uniontown; Lee E. Vescelius, Akron, all of Ohio

[73] Assignee: The Firestone Tire & Rubber Company, Akron, Ohio

[21] Appl. No.: 1,623

[22] Filed: Jan. 8, 1979

Related U.S. Application Data

[60] Continuation-in-part of Ser. No. 879,308, Feb. 21, 1978, abandoned, which is a division of Ser. No. 806,036, Jun. 13, 1977, abandoned.

[51] Int. Cl.$^3$ .............................................. C08L 53/00
[52] U.S. Cl. ...................................... 525/99; 525/95; 525/98; 525/209; 525/211; 525/218; 525/223; 525/232; 525/241
[58] Field of Search ................. 525/95, 209, 210, 213, 525/215, 232, 236, 237, 240, 99, 98, 97

[56] References Cited

U.S. PATENT DOCUMENTS

| | | | |
|---|---|---|---|
| 3,407,253 | 10/1965 | Yoshimura et al. | 525/232 |
| 3,830,767 | 8/1974 | Condon | 260/28.5 B |
| 4,151,159 | 4/1979 | Geall et al. | 525/227 |

*Primary Examiner*—J. Ziegler

[57] ABSTRACT

Thermoplastic elastomer compositions of the present invention comprise a blend of from about 10 to about 50 parts by weight of a crystalline 1-olefin polymer, from about 80 to about 15 parts by weight of a styrene-butadiene rubber, and from about 5 to about 55 parts by weight of a highly saturated elastomer. The thermoplastic blends have very good physical properties, especially tear strength, tensile strength, elongation at break, low temperature impact resistance, minimum creep at high temperatures, and smooth surfaces when injection molded. The compositions, which may be partially cured, also have excellent aging properties, as well as paint adhesion. The compositions are a true thermoplastic in that they can be repeatedly processed and yet maintain their good physical properties.

6 Claims, No Drawings

THERMOPLASTIC ELASTOMER BLENDS

CROSS-REFERENCE

The present application is a continuation-in-part of U.S. Ser. No. 879,308, filed Feb. 21, 1978, now abandoned which relates to "Thermoplastic Elastomer Blends of 1-Olefin Polymers with Styrene-Butadiene Rubber", which is a division of U.S. application Ser. No. 806,036, filed June 13, 1977, now abandoned.

BACKGROUND OF THE INVENTION

The present invention relates to thermoplastic elastomer compositions made from blends of 1-olefin polymers such as polypropylene, styrene-butadiene rubber, and highly saturated elastomers such as highly hydrogenated polybutadiene, polyisobutylene, and other highly saturated elastomers, with the compositions requiring no curing or vulcanization to develop elastomeric properties. Additionally, the invention also relates to partially cured compositions. These partially cured compositions are still thermoplastic and can be repeatedly remolded or extruded and require no further cure.

Heretofore, a few specific types of thermoplastic elastomers have been known. The term "thermoplastic elastomer" has generally been applied to elastomers which can be readily processed and reprocessed, molded, or the like by common or conventional thermoplastic methods and which do not require vulcanization to develop the various physical properties.

Previous specific types of known thermoplastic elastomers are the thermoplastic urethanes, the thermoplastic polyesters, such as the Hytrel brand manufactured by DuPont, and the styrene block copolymers sold under the brand names of Kraton and Solprene, manufactured respectively by Shell Oil Company and Phillips Petroleum.

Another very recent thermoplastic elastomer is a blend of polypropylene and EPDM (ethylene-propylene-nonconjugated diene monomer) as described in U.S. Pat. Nos. 3,758,643; 3,806,558; and 3,862,106 to Fischer of Uniroyal, Inc. The blends are partially cured and contain EPDM in amounts up to 90 percent by weight.

Various prior art patents generally disclose blends of a triblock copolymer such as styrene-butadiene-styrene with a polyolefin such as the following Shell patents, U.S. Pat. No. 3,424,649 and U.S. Pat. No. 3,793,283. Such patents are not pertinent, however, in that they fail to suggest any blend containing random polybutadiene-co-styrene or any component of a highly saturated elastomer.

U.S. Pat. No. 3,299,174 relates to a blend of polypropylene and a saturated block copolymer as of the S—B—S type.

U.S. Pat. No. 3,830,767 is very similar except that it additionally contains a petroleum hydrocarbon wax to minimize the bleeding of extended oils from the propylene-block copolymer composition. This patent is not pertinent to the present invention in that it also lacks polybutadiene-co-styrene and a saturated elastomer. Still further examples of blends of polypropylene and styrene-butadiene block copolymers include U.S. Pat. Nos. 3,689,595 and 3,850,474 wherein such a blend is utilized for automobile body components. A crosslinked blend is set forth in U.S. Pat. No. Re 28,688.

Various other prior art patents disclose blends of 1-olefin polymers and elastomers. For example, U.S. Pat. No. 3,572,721 to Harrison relates to a golf ball made from a blend of rubber and a thermoplastic. In order to render the ball effective for use, it must be fully cured.

U.S. Pat. No. 3,665,059 to Mahlman relates to polyphase compositions having, as a continuous phase, a propylene polymer, and as a second phase, a synthetic or natural rubber, which compositions are prepared by disbursing a propylene polymer of substantially submicron particle size in the second phase and by mixing the polymer under conditions which ensure formation of the propylene polymer in a continuous phase.

U.S. Pat. No. 3,701,702 to Schichman relates to a method of free curing rubber by adding polypropylene to synthetic rubbers or to natural rubber, or blends thereof and, thus, lacks any suggestion of saturated elastomers.

U.S. Pat. No. 2,877,206 to Scott relates to a peroxide treatment of blends of polymers of 1-olefins and hydrogenated diene polymers. A cured or vulcanized blend results, which is distinguished from the present invention in failing to suggest a thermoplastic elastomer.

U.S. Pat. No. 4,104,210 to Coran et al relates to blends of 55 to 75 percent by weight of high unsaturated diene rubber with 25 to 45 percent of a polyolefin wherein primarily the toughness, as represented by $TS^2/E$ where TS is tensile strength and E is Young's Modulus, is increased by at least 50 percent or more than a blend containing 50 percent of each component. Moreover, the rubber particles which have a particle size of 50 microns or less are distributed throughout the polypropylene resin. This patent fails to teach or suggest a triblend, a blend having good to excellent paint adhesion, a blend having a very smooth painted surface, as well as a blend having unexpectedly and significantly improved physical properties at low or very low cure levels.

The above prior art patents, when combined in any combination whatsoever, are still not pertinent to the present invention for at least the reasons that such combination is not rendered obvious by the patents themselves and further in that they relate to different blend compositions which often are fully cured.

SUMMARY OF THE INVENTION

It is therefore an object of the present invention to provide a thermoplastic elastomer composition comprising a blend of a 1-olefin polymer, a styrene-butadiene copolymer, and a highly saturated elastomer.

It is another object of the present invention to provide a thermoplastic elastomer composition, as above, wherein such compositions may or may not be partially cured, wherein they have good physical properties without the requirement of any vulcanization, and wherein they may be readily reprocessed and still retain their good physical properties.

It is a further object of the present invention to provide a thermoplastic elastomer composition, as above, wherein the blends are mixed at or above the melting temperature of said 1-olefin polymers or copolymers.

It is another object of the present invention to provide a thermoplastic elastomer composition, as above, wherein said 1-olefin polymer is polypropylene and said highly saturated elastomer is selected from the class consisting of hydrogenated polybutadiene, polyisobutylene and copolymers thereof such as butyl rubber, ethylene-propylene rubber, (EPM), a copolymer of ethylene-vinyl acetate, a copolymer of ethylene-ethylacrylate, EPDM (ethylene-propylene-diene monomer), a hydrogenated triblock copolymer of styrene-butadiene-styrene, and combinations thereof.

It is yet another object of the present invention to provide a thermoplastic elastomer composition, as above, which has very good tear and tensile strength, exceedingly good ozone resistance and aging properties, very good paint adhesion, a very smooth surface, a low brittle point, good low temperature impact resistance, minimum creep at high temperatures, and good elongation.

Generally, such a thermoplastic elastomer composition, comprises a blend of from about 10 to about 50 parts by weight of a crystalline 1-olefin polymer, said 1-olefin polymer selected from the class consisting of a homopolymer or a copolymer made from 1-olefin monomers having from 2 to 20 carbon atoms, said homopolymer or said copolymer having a melting point of at least 90° C.;

from about 80 to about 15 parts by weight of a styrene-butadiene copolymer rubber; and from about 5 to about 55 parts by weight of a highly saturated elastomer, said blend forming a thermoplastic elastomer.

Additionally, a thermoplastic elastomer composition, comprises a blend of from about 10 to about 50 parts by weight of a crystalline 1-olefin polymer, said 1-olefin polymer selected from the class consisting of a homopolymer and a copolymer made from 1-olefin monomers having from 2 to 20 carbon atoms, said homopolymer or said copolymer having a melting point of at least 90° C.;

from about 80 to about 15 parts by weight of a styrene-butadiene copolymer rubber; and from about 5 to about 55 parts by weight of a highly saturated elastomer, said blend being partially cured and having a melt flow index of at least 1.0 so that a thermoplastic elastomer is formed.

Generally, a process for making a thermoplastic elastomer blend composition, comprises the steps of providing a blend of 1-olefin polymer, a styrene-butadiene copolymer rubber and a highly saturated elastomer, the amount of said 1-olefin polymer ranging from about 10 to about 50 parts by weight, the amount of said styrene-butadiene rubber ranging from about 80 to about 15 parts by weight, the amount of said highly saturated elastomer ranging from about 5 to about 55 parts by weight, said 1-olefin polymer selected from the class consisting of a homopolymer and a copolymer made from 1-olefin monomers having from 2 to about 20 carbon atoms, said homopolymer or said copolymer having a melting point of at least 90° C., and mixing said blend at a temperature at or above the melting point of said crystalline 1-olefin polymer so that a reprocessable thermoplastic elastomer blend is formed.

Additionally, a process for making a thermoplastic elastomer blend composition, comprises the steps of:

providing a blend of a 1-olefin polymer, a styrene-butadiene rubber and a highly saturated elastomer, the amount of said 1-olefin polymer ranging from about 10 to about 50 parts by weight, the amount of said styrene-butadiene rubber ranging from about 80 to about 15 parts by weight, the amount of said highly saturated elastomer ranging from about 5 to about 55 parts by weight, said 1-olefin polymer selected from the class consisting of a homopolymer and a copolymer made from 1-olefin monomers having from 2 to about 20 carbon atoms, said homopolymer or said copolymer having a melting point of at least 90° C., mixing said blend at a temperature at or above the melting point of said 1-olefin polymer, and partially curing said blend to have a melt flow index of at least 1.0 so that a reprocessable thermoplastic elastomer is produced.

Additionally, the composition and process for making the thermoplastic elastomer composition can include the additional step of partially curing said composition to have a melt flow index of at least 1.0.

PREFERRED EMBODIMENTS

The thermoplastic elastomer compositions of the present invention relate to uncured or partially cured blends of 1-olefin polymers, styrene-butadiene rubber, and highly saturated elastomers. The 1-olefin polymer can be a homopolymer or a copolymer of various 1-olefin monomers having from 2 to 20 carbon atoms and having a number average molecular weight of from about 10,000 to about 1,000,000. Examples of suitable 1-olefin monomers include ethylene, propylene, 1-butene, 1-pentene, 1-hexene, 1-octene, 4-methyl-1-hexene, 4-ethyl-1-hexene, 6-methyl-1-heptene, and the like. A preferred monomer is ethylene with a highly preferred monomer being propylene. It is an important aspect of the present invention that only 1-olefin polymers or copolymers be utilized which have a melting point of 90° C. or higher. Thus, whenever various 1-olefin monomers are utilized in preparing a copolymer, the amount of each must be such that a copolymer is produced having a melting point of at least 90° C. and preferably at least 130° C. A preferred copolymer is made from a major amount by weight of ethylene monomers and a minor amount of propylene monomers. A highly preferred copolymer is made from a major amount by weight of propylene and a minor amount by weight of ethylene.

The amount by weight of the 1-olefin polymer or copolymer in the total blend ranges from about 10 parts to about 50 parts with from about 30 parts to about 45 parts being preferred. The weight of the styrene-butadiene rubber ranges from 80 parts to about 15 parts by weight with from 50 parts to 20 parts by weight being preferred. Moreover, the weight of the styrene-butadiene rubber within the triblend preferably ranges from about 30 percent to about 53 percent by weight based upon the total weight of the triblend. Both the 1-olefin polymer or copolymer and the styrene-butadiene rubber are generally in a continous phase.

The butadiene-styrene rubber is a random copolymer made from monomers of butadiene and styrene. The copolymer can be prepared in any common or conventional manner well known to the art such as by solution or emulsion polymerization. Additionally, the specific type of styrene-butadiene rubber may vary. For example, the butadiene portion may be largely 1,2-polybutadiene, that is, as high as 90 or even 100 percent, or largely 1,4-polybutadiene, that is, as high as 90 or even 100 percent. The amount by weight of the butadiene may vary greatly with a range of from about 60 percent to about 90 percent by weight based upon the total copolymer being preferred. The number average molecular weight of the copolymer is generally from about 50,000 to about 1,000,000.

Similarly, the 1-olefin polymer such as the preferred polyethylene and the highly preferred polypropylene may be prepared in any common or conventional manner so long as it is largely crystalline such as an isotactic configuration. Generally, the melt flow index of the 1-olefin polymer and especially polypropylene can range from about 0.4 to about 30 with a preferred range being from about 2 to about 12 according to ASTM No. D1238. Thus, an isotactic 1-olefin polymer is preferably utilized, although an amount such as from 0.1 up to about 15 percent by weight, based upon the total weight of the 1-olefin polymer of a low crystalline atactic configuration may be utilized. Small amounts of the atactic configuration of a particular 1-olefin polymer are not only economical, but also improve flow and do not significantly reduce the various physical properties. Generally, amounts in excess of a total of 15 percent of an atactic configuration of a specific 1-olefin polymer are undesirable since the physical properties are reduced; but, in some applications, such a blend may be acceptable and even desirable.

Regardless of the specific type of 1-olefin polymer utilized, the particle size is that produced by normal and conventional polymerization techniques. Generally, the particle size is greater than 1.0 microns and desirably larger than 5.0 microns. From a practical standpoint, large particles such as up to 2 millimeters may be conveniently utilized, as well as even larger particles.

The amount of the highly saturated elastomer ranges from about 5 parts to about 55 parts by weight and preferably from about 8 parts to about 35 parts. By the term "highly saturated," it is meant that at least 70 percent of the double bonds originally present in the various polymers or copolymers have been removed by hydrogenation and preferably at least 90 percent. Hydrogenation may be carried out according to any conventional method or manner and is not within the scope of the present invention. Naturally, some types of elastomers will be fully saturated (i.e. about 100 percent) when made, such as polyisobutylene, ethylene-vinylacetate copolymers, and ethylene-ethylacrylate copolymers. The molecular weight of the highly saturated elastomers will range from about 30,000 to about 1,000,000.

Polymers made from dienes containing from 4 to about 10 carbon atoms constitute one class of compounds as well as a preferred class of compounds which may be hydrogenated and utilized in the present invention. Examples of specific diene monomers include 1,3-butadiene, isoprene (2-methyl-1,3-butadiene); pentadienes such as piperylene (1,4-pentadiene) and 2-methyl-1,3-pentadiene; hexadienes such as 1,5-hexadiene, and 3,4-dimethyl-1,5-hexadiene, heptadiene such as 1,5-heptadiene; octadiene such as 1,5-octadiene, 4,5-diethyl-1,3-octadiene, and 3-butyl-1,3-octadiene; and the like. The highly saturated polydienes may be random, high vinyl, (that is contain a vinyl content of at least 70 percent and preferably at least 90 percent), or may be a block homopolymer (for example, with regard to polybutadiene, may contain 1,2 blocks and/or 1,4 blocks). Desirably, the number average molecular weight range is from about 10,000 to about 500,000. Of the various saturated polydiene compounds, polybutadiene and polyisoprene are preferred.

Polyisobutylene is another elastomer which may be utilized and, as known to one skilled in the art, is generally fully (that is, approximately 100 percent) saturated. Moreover, copolymers of polyisobutylene, that is, butyl rubber, made from monomers of isobutylene and small amounts of various dienes as set forth above, can also be utilized. The amount of diene monomers such as isoprene in the polymer chain may range from about 0 percent to about 10 percent and, preferably, from about 1 percent to about 3 percent. Additionally, the butyl rubber copolymer may be chlorinated or brominated such that it contains from about 1 percent to about 5 percent by weight of either chlorine or bromine units and is commonly referred to as chlorobutyl or bromobutyl rubber. The number average molecular weight range of the polyisobutylene homopolymer or the copolymer thereof ranges from about 10,000 to about 500,000 with a preferred range being approximately 50,000 to 300,000. Butyl rubber constitutes a preferred compound with polyisobutylene being a highly preferred compound. A specific example of a polyisobutylene is Vistanex L-80 manufactured by Exxon.

Two other highly saturated elastomers include EPM (ethylene-propylene rubber) or EPDM (ethylene-propylene terpolymer rubber). Such elastomers are well known to those skilled in the art. Although usually two mono-olefins are used, it is to be understood that not only may mono-olefins other than preferably ethylene and propylene be utilized, for example alpha-olefins containing from 3 to 12 carbon atoms, but also three or more such mono-olefins. While the mono-olefin copolymer rubber may be a saturated material, as in ethylene-propylene copolymer rubber (EPM), a small amount of at least one copolymerizable polyene can be included to confer saturation on the copolymer. Although conjugated dienes such as butadiene, or 5-ethylidene-2-norbornene, or isoprene may be utilized, it is commonly practiced to employ a non-conjugated diene including a cyclic diene such as a bridged ring cyclic diene as in dicyclopentadiene, or other polyenes having two or more double bonds. Specific examples of EPDM as well as EPM are set forth in U.S. Pat. Nos. 3,758,643, 3,806,558 and 3,862,106, which are hereby fully incorporated by reference. Generally, the number average molecular weight range of such compounds may range from about 50,000 to about 1,000,000.

Ethylene-vinylacetate copolymers constitute yet another class of elastomers which may be utilized in the present invention and, as known to those skilled in the art, such copolymers are generally fully saturated (i.e., approximately 100 percent). The amount by weight of the vinyl acetate constitutent can vary from about 15 percent to about 45 percent. The molecular weight is desirably such that the copolymer has a melt flow index of from about 2 to about 500 utilizing ASTM #D-1238. Generally, any conventionally made ethylene-vinyl acetate copolymer may be utilized such as Elvax 150, manufactured by DuPont.

Yet another suitable elastomer is ethylene-ethylacrylate which, as known to those skilled in the art, is generally fully saturated (i.e., approximately 100 percent). The amount of the ethylene constituent by weight ranges from about 10 percent to about 50 percent. A suitable number average molecular weight is from about 50,000 to about 1,000,000. A specific example of such a copolymer is Zetafin Type 30, manufactured by DuPont.

Other elastomers are the hydrogenated diblock or triblock copolymers made from conjugated dienes having from 4 to 10 carbon atoms and from vinyl substituted aromatic hydrocarbon compounds having from 8 to 12 carbon atoms. Examples of specific diene monomers include butadiene, isoprene, piperylene, 2,3-dimethylbutadiene, hexadiene, and the other dienes, previously set forth above. Polyisoprene is desirable and polybutadiene is highly preferred. Specific examples of suitable vinyl-substituted aromatic compounds include styrene, alpha-methylstyrene, ortho-, para-, and meta-methyl or ethyl styrene, and the like. Alpha-methylstyrene is desirable, while styrene is highly preferred. The usual type of triblock copolymer has the structure A—B—A, where the A block is made from a vinyl substituted aromatic monomer and the B block is made from a conjugated diene monomer. Thus, the highly preferred triblock copolymer of the present invention has the structure, polystyrene-polybutadiene-polystyrene. Similarly, the usual type of diblock copolymer has the structure A—B where A and B are as indicated immediately above. Thus, the highly preferred diblock copolymer of the present invention has the structure, polystyrene-polybutadiene. Moreover, it is within the scope of the present invention to utilize a multiple diblock copolymer including a copolymer having the structure (S—B)$_n$ where n is usually 2 through 4 or 5.

However, by the term "triblock copolymer", it is meant to also include linear block copolymers having the general formulation (A—B—A—(B—A)$_n$, while the branched configurations may have, among other alternatives, the general structure such as

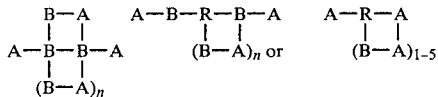

The latter configurations, as well as some linear configurations, may be created by coupling agents employed as alternatives in the block copolymer preparation, another alternative being a sequential process for the block copolymer synthesis. The subscript n has an integer usually between about 0 and 5. The coupling agent residue, if monomeric, is ignored in these general formulae. However, if a polymeric coupling agent such as epoxidized dienes (e.g., epoxidized polybutadiene) is utilized, the symbol R may represent the coupling agent residue.

Generally, the amount of the diene repeating structure in the triblock or diblock copolymers ranges from about 50 to about 90 percent by weight with from about 60 to about 70 percent being preferred. Moreover, if the B block is polybutadiene, from about 0 to about 100 percent and, preferably, from about 9 to about 20 percent 1,2-microstructure is desired. The diene or B blocks have a molecular weight of from about 25,000 to about 200,000, desirably from about 30,000 to about 150,000, and preferably from about 35,000 to about 90,000. In contrast, the vinyl substituted aromatic or A block portion of the block copolymer has a molecular weight of at least 5,000 and desirably from about 7,500 to about 100,000.

The blend of the 1-olefin polymer, the styrene-butadiene rubber, and the highly saturated elastomer, whether or not partially cured, results in a thermoplastic elastomer. That is, the blend is considered a thermoplastic elastomer in that it can be repeatedly reprocessed even if partially cured. In other words, the blend can be readily and repeatedly molded, extruded, or otherwise processed since it flows at temperatures at or above the melting point of the 1-olefin polymer. Generally, a partial cure is preferred in that the physical properties are improved including a remarkable increase in aging properties.

By partial cure, it is meant that the styrene-butadiene rubber portion of the blend is crosslinked to an extent less than full cure or vulcanization. According to the concepts of the present invention, a partial cure is achieved when the melt flow index (ASTM No. D1238, condition "L", but with the exception that the load is 100 pounds) is at least 1.0 and preferably 10.0 or greater. Compositions of the 1-olefin polymer, styrene-butadiene rubber and the saturated elastomer, which are cured in excess of a partial cure and thus have a melt flow index below 1.0, result in vulcanized blends of thermoset elastomers which are clearly outside the scope of the present invention. The partial cure may be obtained utilizing any conventional curing agent, compound or method, as set forth below. Generally, good blends of the present invention will have a melt flow index of from about 90 to about 150.

It is a critical aspect of the present invention that the 1-olefin polymer, the styrene-butadiene rubber, and the highly saturated elastomer be mixed together at a temperature equal to or greater than the melting point of the 1-olefin polymer. Due to variations in molecular weight and tacticity, the melting point will vary over a small range from the particular 1-olefin polymer. The typical polyethylene will have a melting point range of from about 127° to about 140° C. with a typical melting point of approximately 135° C. The melting point range for the highly preferred polypropylene is from about 150° C. to about 175° C. with a practical or typical melting point temperature of from about 160° C. Thus, temperatures within this range, or desirably above it, are necessary to the present invention. The actual blending or mixing may be according to any common or conventional mixing process and, thus, may conveniently take place on a mill, a Banbury, a Brabender, a twin screw extruder, or the like. When a partial cure is utilized, preferably the three components are first blended and then partially cured, although the styrene-butadiene rubber can be initially partially cured and then blended with the 1-olefin polymer and the saturated elastomer.

Another method of preparation involves the addition of all dry ingredients to a styrene-butadiene rubber latex. When the SBR latex is coagulated by standard and well known techniques, all ingredients are intimately mixed. This mixture is then mixed in any manner, as on a mill, at temperatures above the melting point of the polypropylene and the thermoplastic elastomer blend is formed.

If a partial cure is utilized, the curing agent can be conveniently added as well as other conventional processing aids, compounding ingredients, and the like either before or during the blending step. Moreover, the partial cure may be achieved under either static conditions or under dynamic conditions. Under static conditions, the partial cure can be achieved by placing a mixed blend containing the curing agent in an oven and heating to a desired temperature, whereby partial cure occurs such as at a temperature of from about 65° C. to about 260° C. for approximately 5 to 30 minutes. The dynamic partial cure is achieved by working or processing the blend containing the curing agent on an open mill, in a Banbury, in an extruder, or the like, at a temperature sufficient to bring about a partial cure such as from about 65° C. to about 210° C. for approximately 5 to 20 minutes. Even if the dynamic cure occurs below the melting point of the 1-olefin polymer, the dynamic blend temperature must be at a temperature above the melting point of the 1-olefin polymer.

As noted, the curing agent utilized, when a partial cure is desired, may be any known or conventional rubber curative or method known to those skilled in the art. Variations from standard procedures or compounds may, of course, be utilized. Typical types of curing agents include the sulfur curatives such as sulfur, itself, or sulfur donors, the various peroxides, whether aromatic or aliphatic, and low dosages of irradiation. If a sulfur curative is utilized, generally from 0.01 to about 1.0 parts by weight per 100 parts of the blend is utilized with the preferred range being from about 0.1 to about 0.2 parts. Some representative examples of sulfur curatives include sulfur, tetramethyl thiorea, 2-(hexamethyleniminothio)-benzothiazole, sulfur dichloride, sulfur monochloride, alkyl phenol, disulfide, and tetramethyl thiuram disulfide. A preferred curative is sulfur, itself. Generally, it is desirable to use with the sulfur from about 0.5 to about 5 parts per 100 parts of blend of zinc oxide, conventional amounts of stearic acid and an accelerator since very good antioxidant properties are imparted to the blend. In addition, this particular partial cure system in combination with carbon black, surprisingly, gives superior paint adhesion. These unexpected results are especially noted with regard to the highly preferred 1-olefin polymer of polypropylene.

The amount of the organic peroxides to effect a partial cure generally varies from about 0.01 to about 0.5 parts by weight per 100 parts of the blend with a preferred range being from about 0.1 to about 0.3. Once again, any conventional peoxide compound may be utilized such as the aromatic diacyl peroxides, dibasic acid peroxides, ketone peroxides, alkyl peroxyesters, alkyl hydroperoxides, and the like. Specific examples include dicumyl peroxide, dibenzoyl peroxide, diacetyl peroxide, bis-2,4-dichlorobenzoyl peroxide, ditertiary-butyl peroxide, tertiary-butylcumyl peroxide, and the like. Of course, the number of the various peroxides is enormous and generally any of them can be utilized, with the above specific compounds merely being representative examples. A preferred peroxide curative is dicumyl peroxide and 2,5-bis(tertiary-butylperoxy)2,5-dimethylhexane.

Of course, multiple peroxide curatives, multiple sulfur curatives, as well as combinations of sulfur and peroxide curatives may be utilized as well known to those skilled in the art. Furthermore, the amount of the curative range set forth above, naturally, represents the amount of the active compound. Thus, if a curative is utilized such as dicumyl peroxide in a solvent system, only the weight of dicumyl peroxide itself is considered. Additionally, the exact amount of a specific curative utilized to obtain a specific melt flow index will vary from one specific curative to another, depending on the general activity or efficiency of the specific curatives.

Another method of achieving the partial cure involves subjecting the blend to ionizing irradiation. Ionizing rays include alpha rays, beta rays, gamma rays, electron beam, proton rays, neutron rays, and X-rays. In most commercial applications, an accelerated electron beam is utilized. The irradiation is desirably carried out by subjecting pellets or a thin layer of the blend to the irradiation. The irradiation may be admitted from one side or from both sides of the blend composition. The amount of irradiation, of course, will vary with the thickness of the blend composition. In any event, a desirable amount of irradiation is that which results in a partially cured blend having a melt flow index above the index number set forth above. Due to the inherent nature of the irradiation application, the crosslink density of the styrene-butadiene copolymers will vary with the distance from the irradiated surface. This aspect is acceptable as long as an overall, partially cured system is produced. However, too high of a dose will result in a crosslinked system which cannot be molded or extruded, that is, it is not reprocessable. Generally, when the irradiation is admitted to only one side of the blend composition, the amount of irradiation may vary from about 0.1 to about 5.0 Megarads, when an electron accelerator is utilized, and from about 0.1 to about 3.0 Megarads, when the irradiation is applied to each side of the blend composition.

In addition to the curing agents, as noted above, other rubber components, compounding agents, fillers, processing aids, and the like may be added in conventional amounts. Specific types of additives include, in addition to accelerators, activators, colorants, antioxidants, flame retardants, ozone resistant compounds, and various processing aids such as oil, steric acid, and the like. Examples of fillers include carbon black, such as from about 0.1 and preferably from about 0.6 parts to about 30 or 40 parts by weight per 100 parts of the blend. Other fillers such as silica, the various clays, calcium carbonate, talc, and the like can be utilized in conventional amounts.

The compositions of the present invention have unexpected and improved synergistic physical properties above and beyond that of blends of polypropylene and styrene-butadiene rubber. As readily apparent from the examples herein, the compositions have improved tensile strength, improved tear strength, and improved elongation. Generally, the composition, whether or not partially cured, can be described as a tough but yet flexible thermoplastic material. The composites of the present invention may generally be utilized for a wide array of products and may be calendared, molded, injection molded, extruded, and the like. Moreover, another improved property is that, even though extruded, the product or article has a smooth surface and thus when painted results in a glossier surface than before, and yet excellent paint adhesion is still maintained.

The amount of the various components can be varied to achieve an exact combination of physical properties desired for a particular application. For example, in automotive exterior applications, it is imperative that the material be able to withstand impact at low temperature. It should also have a smooth surface and good paint adhesion. The compositions generally exhibit these properties when amounts of the various components are as set forth in the examples. However, when the same material is used to make a kitchen spatula, low temperature impact is irrelevant and, thus, if desired, the exact formulation may be changed. Accordingly, the thermoplastic elastomer compositions of the present invention are very versatile in that changes of the ratio of one component, for example, styrene-butadiene rubber to the remaining components can be made within the above set forth parameters and result in a wide range of desired physical properties. These changes will be obvious to those skilled in the art of rubber or plastics compounding.

The thermoplastic elastomer blends of the present invention may be utilized to produce articles as by molding, extruding, calendaring, vacuum-forming, and the like, with specific articles including tubing, gaskets, toys, and household articles. A desired area of use resides in various automobile parts such as flexible bumpers, dash panels, bumper filler panels, and the like.

The invention will be better understood by reference to the various examples.

The following list identifies the various materials used in the examples.

| | |
|---|---|
| Profax 6523 | An isotactic polypropylene with a melt flow index of 4.0, made by Hercules, Inc. |
| FRS-1502 | A Firestone "cold" emulsion polymerized SBR copolymer with 23.5 percent bound styrene, ML/4/212 = 45. |
| TMTD | Tetramethylthiuram disulfide. |
| Vistanex L-80 | Polyisobutylene made by Exxon. |
| Agerite Superlite Solid | Butylated bisphenol A, made by RT Vanderbilt Company. |
| Irganox 1076 | An antioxidant, made by Ciba-Geigy Chemical Corporation. |
| HD-55 | A solution polymerized polybutadiene made by Firestone containing 11 percent vinyl, $M_n = 167,000$. |
| Saturated polybutadiene No. 1 | 90 percent hydrogenated 1,4-b-1,2-PBD, $M_n(1,4) = 99,000$; $M_n (1,2) = 28,000$. |
| Saturated polybutadiene No. 2 | 87 percent hydrogenated 1,4-b-1,2-PBD, $M_n(1,4) = 139,000$; $M_n (1,2) = 33,000$. |
| Saturated polybutadiene No. 3 | 100 percent hydrogenated medium vinyl polybutadiene, $M_n = 130,000$ - 32 percent 1,2. |
| Saturated polybutadiene No. 4 | 97 percent hydrogenated SBR-b-1,2-PBD, $M_n$ (SBR) = 354,000; $M_n$ (1,2) = 18,000, 25 percent styrene. |
| Epcar 306 | Partially crystalline ethylene-propylene rubber manufactured By B.F. Goodrich. |
| Elvax 150 | Ethylene-vinyl acetate copolymer manufactured by DuPont. |
| Zetafin Type 30 | Ethylene-ethylacrylate copolymer manufactured by DuPont. |

The various samples having the formulation set forth in Table I were prepared in the following manner.

The various samples were prepared in a laboratory Banbury Mixer having a batch size of 1,200 grams. All ingredients except the sulfur and accelerator were added to the Banbury operating at 120 rpm. In about two minutes, the temperature had reached 330° F. and the polypropylene began to melt. After an additional minute, the sulfur and accelerator were added and mixing was continued for three additional minutes. The batch was then dumped and sheeted on a hot mill and cut into pieces that were ground in a Wiley mill. The material was then injection molded and tested for physical properties.

TABLE I

| SAMPLE | SI502 | PROFAX 6523 | A | B | C | D | E | F | EPCAR 306 | VISTANEX L-80 | ELVAX 150 | ZETAFIN TYPE 30 |
|---|---|---|---|---|---|---|---|---|---|---|---|---|
| 1 (CONTROL) | 60 | 40 | — | — | — | — | — | — | — | — | — | — |
| 2 | 50 | 40 | 10 | — | — | — | — | — | — | — | — | — |
| 3 | 30 | 40 | 30 | — | — | — | — | — | — | — | — | — |
| 4 | 50 | 40 | — | 10 | — | — | — | — | — | — | — | — |
| 5 | 30 | 40 | — | 30 | — | — | — | — | — | — | — | — |
| 6 | 50 | 40 | — | — | 10 | — | — | — | — | — | — | — |
| 7 | 30 | 40 | — | — | 30 | — | — | — | — | — | — | — |
| 8 | 50 | 40 | — | — | — | 10 | — | — | — | — | — | — |
| 9 | 30 | 40 | — | — | — | 30 | — | — | — | — | — | — |
| 10 | 50 | 40 | — | — | — | — | 10 | — | — | — | — | — |
| 11 | 30 | 40 | — | — | — | — | 30 | — | — | — | — | — |
| 12 | 50 | 40 | — | — | — | — | — | 10 | — | — | — | — |
| 13 | 30 | 40 | — | — | — | — | — | 30 | — | — | — | — |
| 14 (CONTROL) | 63 | 37 | — | — | — | — | — | — | — | — | — | — |
| 15 | 53 | 37 | — | — | — | — | — | — | 10 | — | — | — |
| 16 | 33 | 37 | — | — | — | — | — | — | 30 | — | — | — |
| 17 | 53 | 37 | — | — | — | — | — | — | — | 10 | — | — |
| 18 | 33 | 37 | — | — | — | — | — | — | — | 30 | — | — |
| 19 | 53 | 37 | — | — | — | — | — | — | — | — | 10 | — |
| 20 | 33 | 37 | — | — | — | — | — | — | — | — | 30 | — |
| 21 | 53 | 37 | — | — | — | — | — | — | — | — | — | 10 |
| 22 | 33 | 37 | — | — | — | — | — | — | — | — | — | 30 |

| POLYMER | TYPE | $M_n$ | PERCENT HYDROGENATION | DSV | % 1,2-PBd |
|---|---|---|---|---|---|
| A | 1,4-PBd-b-1,2-PBD | 172K | 87 | 2.0 | 19 |
| B | 1,4-PBd-b-1,2-PBd | 127K | 90 | 1.65 | 22 |
| C | Statistical PBd | 194K | 89 | 1.99 | 70 |
| D | SBR-b-1,2-PBd | 368K | 94 | — | 17 |
| E | Statistical PBd | 155K | 100 | 1.91 | 22 |
| F | HD-55 | — | 75 | — | — |

All of the compounds contain the following additives:
ZnO = 4
Stearic Acid = 1.5
TMTD = 0.4
Sulfur = 0.3
Irganox 1976 = 0.3
FEF C-Black = 5.0

TABLE II

| SAMPLE | ASTM D412 ULTIMATE STRESS (MPa) | ULTIMATE STRAIN | ASTM D624 DIE C TEAR kN/M | SURFACE SMOOTHNESS |
|---|---|---|---|---|
| 1 (CONTROL) | 8.99 | 4.50 | 58.5 | F |
| 2 | 14.2 | 6.18 | 74.8 | G |
| 3 | 24.1 | 7.74 | 87.1 | VG |
| 4 | 15.9 | 7.12 | 76.9 | G |
| 5 | 25.6 | 8.72 | 90.2 | VG |
| 6 | 10.3 | 6.16 | 62.9 | G |
| 7 | 10.9 | 7.25 | 68.9 | VG |
| 8 | 11.3 | 5.64 | 67.0 | G |
| 9 | 16.7 | 7.55 | 76.7 | VG |
| 10 | 13.1 | 5.45 | 69.7 | VG |
| 11 | 21.5 | 6.90 | 81.9 | VG |
| 12 | 11.5 | 4.72 | 67.2 | G |
| 13 | 15.1 | 5.13 | 74.3 | VG |
| 14 (CONTROL) | 7.47 | 3.57 | 52.6 | F |
| 15 | 9.98 | 5.17 | 56.2 | G |
| 16 | 9.60 | 5.54 | 50.7 | VG |
| 17 | 9.92 | 5.44 | 59.5 | G |
| 18 | 11.3 | 6.20 | 59.8 | VG |
| 19 | 9.73 | 4.87 | 58.0 | G |
| 20 | 12.5 | 5.76 | 58.2 | VG |
| 21 | 9.78 | 4.57 | 61.3 | G |
| 22 | 12.9 | 5.74 | 61.7 | G |

F — Fair
G — Good
VG — Very Good

The physical properties of the thermoplastic elastomer blend was generally improved, as readily apparent from Table II. For example, the ultimate stress, the ultimate strain, as well as the tear all showed great improvements over the controls. Moreover, the surface is very smooth and exhibits good paint adhesion.

While in accordance with the patent statutes, various preferred embodiments have been illustrated and described in detail, the scope of the invention is measured by the attached claims.

What is claimed is:

1. A thermoplastic elastomer composition comprising, a blend of
    from about 10 to about 50 parts by weight of a crystalline 1-olefin polymer, said 1-olefin polymer selected from the class consisting of a homopolymer or a copolymer made from 1-olefin monomers having from 2 to 20 carbon atoms, said homopolymer or said copolymer having a melting point of at least 90° C.;
    from about 80 to about 15 parts by weight of a random styrene-butadiene rubber copolymer; and
    from about 5 to about 55 parts by weight of a highly saturated elastomer, said highly saturated elastomer selected from the class consisting of a hydrogenated polymer diene having from 4 to 10 carbon atoms, and a hydrogenated diblock or triblock copolymer made from conjugated dienes having from 4 to 10 carbon atoms and vinyl substituted aromatics having from 8 to 12 carbon atoms,
    the amount of said saturation of said saturated elastomer being at least 70 percent,
    said blend forming a thermoplastic elastomer.

2. A thermoplastic elastomer composition according to claim 1, wherein said 1-olefin homopolymer is selected from the class consisting of polyethylene and polypropylene, wherein said 1-olefin copolymer consists of ethylene-propylene, and
    wherein the amount of said butadiene by weight in said random styrene-butadiene rubber copolymer ranges from about 60 percent to about 90 percent.

3. A thermoplastic elastomer composition according to claim 2, wherein the amount of said 1-olefin polymer ranges from about 30 to about 45 parts by weight, wherein the amount of said styrene-butadiene rubber ranges from about 50 to about 20 parts by weight, and wherein the amount of said saturated elastomer ranges from about 8 to about 35 parts by weight and the amount of saturation of said saturated elastomer is at least 90 percent.

4. A thermoplastic elastomer composition according to claim 3, wherein said 1-olefin homopolymer is polypropylene, wherein said 1-olefin copolymer is made from a major amount by weight of propylene monomers and a minor amount by weight of ethylene monomers, and
    wherein said highly saturated elastomer is selected from the class consisting of a hydrogenated polybutadiene and hydrogenated polyisoprene.

5. A thermoplastic elastomer composition according to claim 4, wherein the molecular weight of said polypropylene or said polypropylene copolymer ranges from about 20,000 to about 1,000,000, wherein the molecular weight of said styrene-butadiene rubber ranges from about 50,000 to about 1,000,000, and wherein the molecular weight of said saturated elastomer ranges from about 10,000 to about 1,000,000.

6. A thermoplastic elastomer composition according to claim 5, wherein the melting point of said 1-olefin polymer or copolymer is at least 130° C.

* * * * *